… …

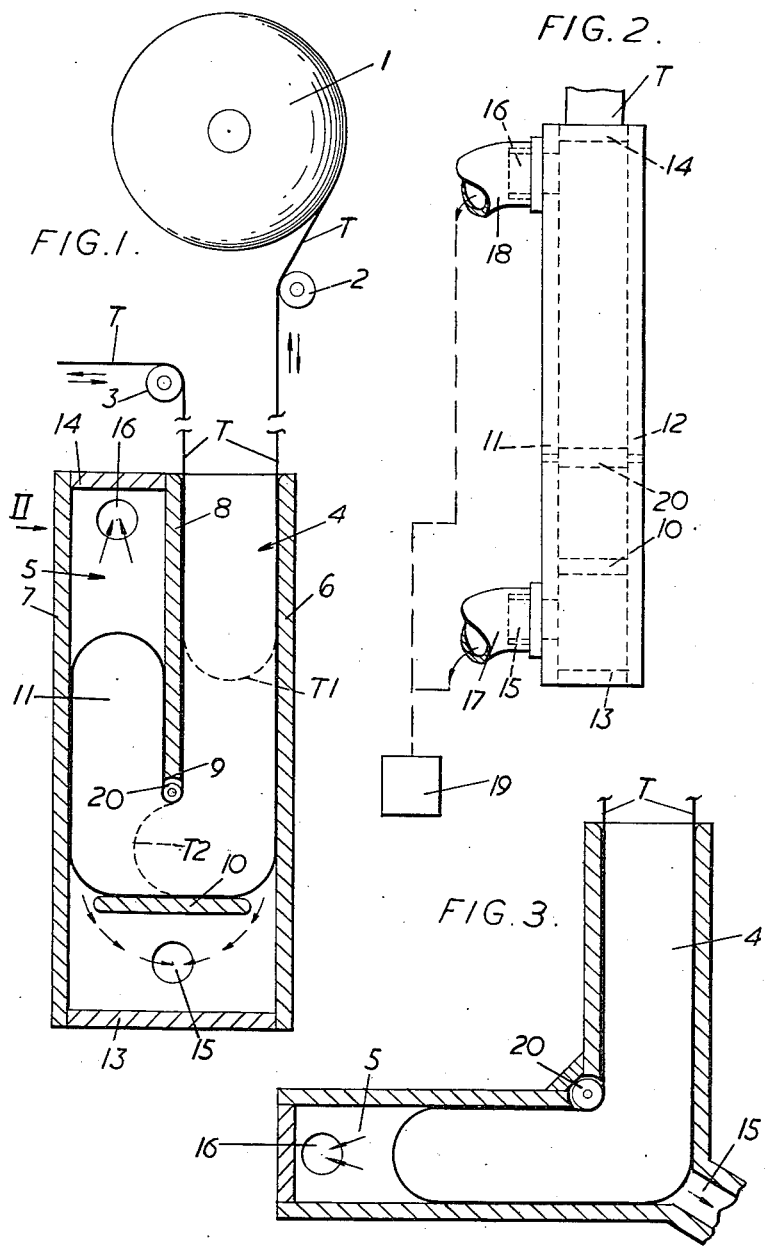

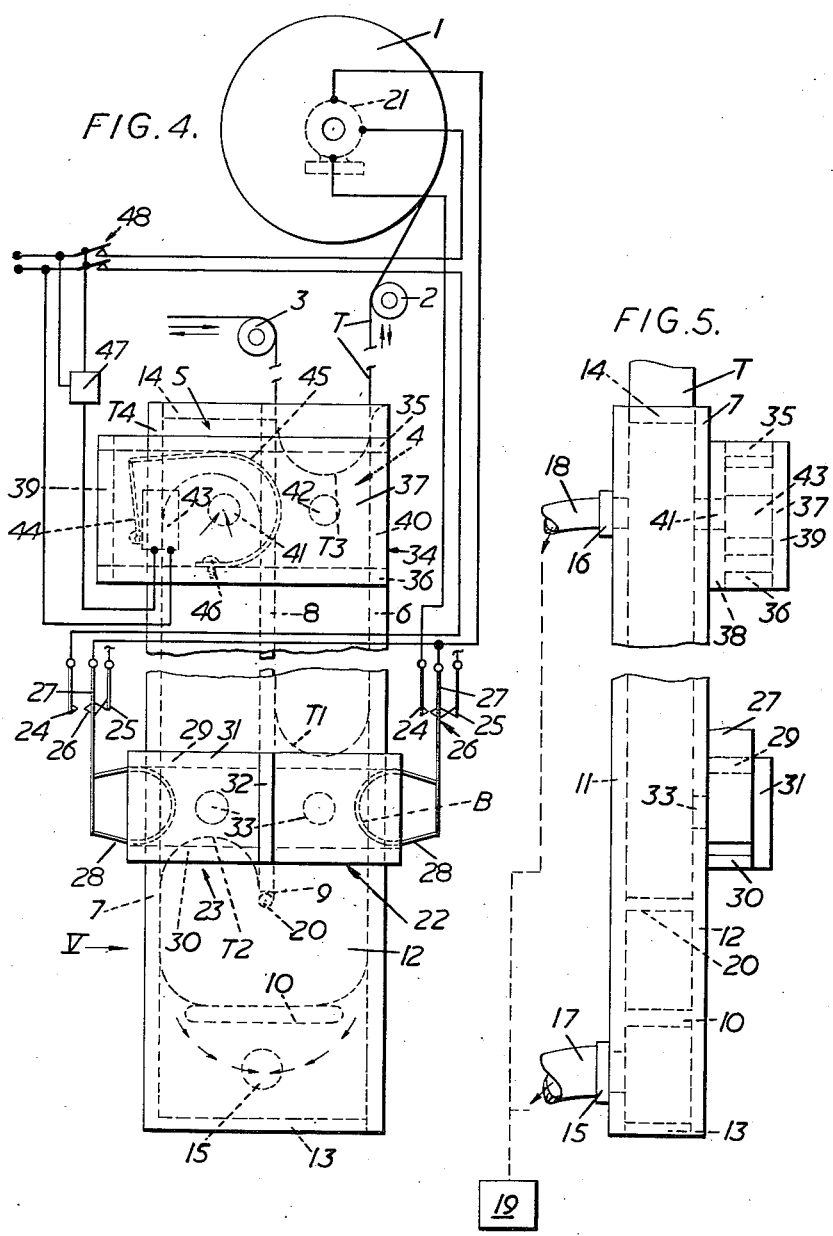

United States Patent Office 2,980,355
Patented Apr. 18, 1961

2,980,355
TAPE-FEEDING APPARATUS

Frederick George Cannings, Sutton, England, assignor to International Computers and Tabulators Limited, London, England, a British company Filed Mar. 12, 1959, Ser. No. 798,999

Claims priority, application Great Britain Mar. 24, 1958

16 Claims. (Cl. 242—55.12)

This invention relates to tape-feeding apparatus and in particular to apparatus of the kind in which a tape, for example a magnetic tape for use in electronic computing machines, can be fed on to or off a spool and in which rotation of the spool and the direction of rotation of the spool can be controlled by the length of a tape loop depending from the spool and drawn into a reservoir by negative air pressure.

Apparatus of the kind above referred to is well known in the art and the purpose of the tape loop is to provide a reservoir of tape which can be drawn upon or fed into whilst the speed of the relatively heavy spool is being changed. In the previously proposed forms of apparatus the tape loop has been drawn into the reservoir by negative air pressure, and photo-electric or other suitable devices have been provided to sense the length of the loop and according as to whether the loop exceeds a predetermined maximum length or fails to reach a predetermined minimum length the photo-electric or other devices initiate retarding or acceleration of the reel.

As is well understood, the physical length of tape loop which can be obtained is restricted by the dimensions of the machine to which the tape-feeding apparatus is fitted and this often means that it is not possible to obtain a tape loop of adequate length for the purposes required of it.

It is a main object of the present invention to provide a tape reservoir which permits the formation of a tape loop the length of which exceeds that which can be obtained within the reservoir by a loop which merely depends into the reservoir, and by the provision of said longer loop to provide a greater period of time in which the spool driving control system can respond thereby to give longer acceleration and deceleration times which permit the tape winding tension to be reduced while reducing to a minimum the usual tendency for the tape to wrinkle on the spool. It is a further object of the invention so to increase the length of the tape loop, as just mentioned, that mechanical stress on the tape-feeding mechanism is reduced, electrical power requirements are reduced, and there is produced a lesser quantity of heat needing dissipation.

According to the present invention a tape reservoir in which a tape can be formed as a loop from which the tape can be withdrawn in either of two opposite directions comprises a first channel to and from which a tape can be fed lengthwise, a second channel communicating with the first channel and into which the loop portion of a looped tape is turned when the length of the loop exceeds that of the first channel, and conduit connections adapted for connection with a source of negative air pressure and communicating with the channels in a manner such as to draw a tape loop lengthwise through the first channel, to turn the loop into the second channel, and to draw the loop lengthwise along the second channel.

It is a further object of the invention to provide means in combination with such a reservoir to render inoperative driving means for the spool in the event that the reservoir, due to the development of a fault in the machine handling the tape fed from the reservoir should tend to become overfull or exhausted, in either of which circumstances there is a possibility that the tape might become damaged.

According to this aspect of the invention the tape spool is arranged to be rotatable in either of two directions by electrically operable driving means and a switch is adapted for connection in the circuit for the driving means and is operable to interrupt said circuit when the air pressure in a predetermined region of one channel equals that of the pressure in a predetermined region of the other channel.

In order that the invention may be clearly understood some embodiments thereof will now be described, by way of example, with refernece to the accompanying diagrammatic drawings, in which:

Figure 1 is a section through a reservoir according to the invention,

Figure 2 is an elevation looking in the direction of arrow II, Figure 1, and

Figure 3 is a section through a modified form of reservoir,

Figure 4 is a broken elevation of tape feeding apparatus according to the invention, and Figure 5 is a view looking in the direction of arrow V, Figure 4, In the drawings like or similar parts are indicated by like reference numerals.

Referring to Figures 1 and 2, a tape T, for example a magnetic tape, is in part contained on a spool 1 from which it passes over guide rollers 2, 3 to a further spool not shown. When the tape is a magnetic tape, for example as used in an electronic computing machine, the tape after passing guide roller 3 is moved beneath a reading and/or writing head, not shown, and as is customary there is provision for the tape to be moved in either of two directions as indicated by the arrows in Figure 1.

Between the tape spool 1 and the guide roller 3 there is located a reservoir in which the tape is looped to provide, as discussed above, a reservoir of tape which can be drawn upon or fed into whilst the speed of rotation of the relatively heavy tape spool is changed. As illustrated in Figure 1, the reservoir comprises a container in which are formed a first channel 4 and a second channel 5 located in side-by-side parallel relation. The channels are formed by the inner sides of the opposed end walls 6, 7 of the container and the opposite sides of a partition 8 which is disposed between the end walls 6 and 7. As can be seen in Figure 1, the partition 8 is of shorter length than that of the opposed end walls 6, 7 and the inner end 9 of the partition is opposed by a baffle element 10 which is spaced therefrom and is transverse thereto. The baffle 10 extends between container side walls 11 and 12 but is spaced from the end walls 6, 7 as illustrated in Figure 1. The lower end of the container is closed by a wall 13 and the upper end of the channel 5 is closed by a wall 14. Conduit connections 15, 16 are provided in the wall 11 and are adapted for connection through conduits 17, 18, Figure 2, with a source of negative air pressure 19 of any suitable form. Conveniently, the source 19 is common to the two conduits 17, 18 although, if desired, each of the conduits 17, 18 may have a source 19 individual thereto.

The mode of operation is such that when there is a short loop of tape located in the first channel 4, as indicated by the dotted lines T1, and the rate at which the tape is drawn from spool 1 exceeds that at which tape is drawn over roller 3, negative air pressure applied to the connections 15, 16 draws the loop downwards towards the baffle 10 and, on reaching the baffle 10, the tape loop is turned, as indicated at T2, and is drawn upwards into the second channel as illustrated in full line in Figure 1. If desired, to reduce friction as the tape turns about the end of the partition 8, a freely rotatable roller 20 is located adjacent the inner end of the partition.

From the foregoing it will be understood that, neglecting friction, the tape is free to slide on the walls of the channels 4, 5 so that the tension in all parts of the tape loop is the same. Further, when the tape is formed to a curve by the negative air pressure exerted thereon, tape tension is dependent on the radius of curvature so that the radius of the loop portion remains constant. It will also be understood that when the loop is drawn upwards into the second channel 5 by negative air pressure exerted thereon from the conduit connection 16, negative air pressure exerted from conduit 15 will cause a portion of the loop always to remain in engagement with the baffle 10 as illustrated in Figure 1.

Suitable means, not shown, such as photo-electric devices, are associated with the channels, in known manner, to determine when the tape loop exceeds or fails to reach a predetermined length. Such means, in known manner forming no part of the present invention, are adapted to control the rate of rotation of the reel.

In the modified form of the invention illustrated in Figure 3, the first and second channels are located substantially at right angles one to the other. It will, however, be understood that in this embodiment of the invention, as was the case with the embodiment thereof described above with reference to Figures 1 and 2, when the length of the loop exceeds that of the first channel, the loop is turned into the second channel thus making provision for a tape loop the length of which is greater than that which can be obtained within the reservoir by a loop which merely depends into the reservoir.

With each of the arrangements described above with reference to the drawings only one slide of the tape is engaged by the sides of the channels 4, 5 and baffle 10 so that when the tape is a magnetic tape it is possible to ensure that the data-bearing side of the tape does not rub against the sides of the channels or against the baffle 10.

Referring to Figs. 4 and 5 the reservoir therein illustrated is, except for the additional apparatus to be described below, the same as that described above with reference to Figures 1 and 2. In this embodiment of the invention the spool 1 is rotated by driving means which comprises a reversible electric motor 21. For the purposes of illustration the tape-feeding apparatus is provided with two pressure-operated switches 22, 23 adapted one to co-operate with the channel 4 and the other to co-operate with the channel 5. The switches are of like construction and are arranged to hold the motor circuit normally open. Each switch comprises fixed contacts 24, 25 and a movable contact 26 located therebetween and biassed, as by a spring mounting 27, to engage the fixed contacts 25. The fixed contacts 25 are connected in a circuit, not shown, which controls the operation of a brake, not shown, for the spool 1.

Each movable contact 26 is connected to the ends of a flexible loop 28 which is located in a chamber for movement in either of two directions according as to whether the tape loop in the reservoir is disposed within the reservoir to permit negative or atmospheric air pressure to be admitted to the chamber through an opening connecting the interior of the reservoir with the interior of the chamber. As illustrated in the drawings, each chamber comprises a top wall 29, a bottom wall 30 and a side wall 31 and, as shown in the drawings, the chambers are provided with a common end wall 32. The remaining wall of the chamber is formed by the side wall 12 of the reservoir and the opening 33 which connects the reservoir with the chamber is formed in the side wall 12 of the reservoir.

When the apparatus is in operation, while the base of the tape loop is below the opening 33 for switch 22, the chamber for switch 22 is at atmospheric pressure and the movable contact 26 is in the biassed position thereof, as shown at the righthand side of Figure 4, in which it is engaged with the fixed contact 25 and the motor circuit is open. If, however, the length of the tape loop shortens so that the base thereof rises above the opening 33 for the switch 22, as indicated at T1, then the pressure in the chamber is reduced to that of the negative air pressure acting on the base portion of the loop and the reduced pressure in the chamber acts on the base portion B of the flexible loop 28 to cause the flexible loop to be drawn to the left, as viewed in Figure 4, so that the movable contact 26 is disengaged from the fixed contact 25 and is moved into engagement with the fixed contact 24 thus causing the tape spool brake to be released and the motor 21 to be started to effect feeding of more tape into the reservoir.

Should the length of the tape loop be such that the base thereof is located above the opening 33 for the switch 23, then the pressure in the chamber associated with this opening 33 is atmospheric pressure so that the flexible loop in the chamber is caused to move to the left, as viewed in Fig. 4. The movable contact 26 for switch 23 is then caused to engage fixed contact 24 thus causing the motor 21 to be started and rotated in a direction such as to rewind the tape on to the spool 1. Rotation of the motor will continue until the base of the tape loop is again disposed below the opening 33 co-operating with switch 23 as indicated at T2, Figure 4, when the pressure in the chamber associated with switch 23 will be restored to that of the negative air pressure applied to the base of the tape through conduit 16 and the switch will return to the normal position thereof, as shown in Figure 4, thus opening the circuit to the motor and causing the brake to be applied to the spool. In Figure 4 the switches 22, 23 have, for convenience, been shown in end-to-end relation but it is to be understood that these switches may be disposed at any desired position along the channels 4, 5.

Although the switches 22, 23 normally control the operation of the tape-feeding apparatus to maintain in the reservoir a tape loop of substantially constant length, a fault may develop in the machine to which the apparatus is fitted such as to cause the length of the tape loop either to become excessive or, alternatively, to become too short and perhaps to run completely out of the reservoir. In either of these conditions there is a possibility that the tape will become damaged and to guard against these two possibilities, there is provided a limit switch 34 which consists of an enclosure formed by top and bottom walls 35, 36, side walls 37, 38 and end walls 39, 40. The side wall 38 is provided with openings 41, 42 which also extend through the side wall 12 of the reservoir. As illustrated in Figs. 4 and 5, the opening 41 is aligned with the opening in the side wall 11 and which is connected to the conduit connection 16. Within the enclosure there is located a switch 43 having a pivoted operating member 44 adapted to effect opening and closing of the switch against a spring, not shown, included in the switch 43. The pivoted operating member 44 is connected to one end of a flexible element shown as a band 45 the opposite end of which is anchored at 46 to the bottom 36 of the enclosure, and the looped portion of the band 45 extends across the enclosure so that the openings 41, 42 are located one to one side of the band and the other to the opposite side thereof during normal operation of the apparatus when the tape loop is under control of the switches 22, 23. The band 45 has atmospheric pressure applied to one side thereof through opening 42 and negative air pressure applied to the opposite side thereof through opening 41. In the event that the tape loop should become too short, as indicated at T3 Figure 4, the band 45 has negative air pressure applied to both sides thereof and the operating member 44 is caused to move so as to open switch 43 thus de-energising a solenoid 47 and causing normally closed contacts 48 to be opened thereby to break the motor circuit before the tape runs completely out of the reservoir. On the other hand, should the tape loop become too long so that the base thereof reaches a position as indicated at T4, Figure 4, then the tape loop is subjected to atmospheric pressure on both sides thereof and again switch 43 will open to cause the contacts 48 to open and break the circuit to the motor 21. Thus it will be seen that the switch 34 is operable to open the motor circuit when the air pressure in a predetermined region of one channel equals that of the pressure in a predetermined region of the other channel.

I claim:

1. A reservoir in which a tape can be formed as a loop from which the tape can be withdrawn in either of two opposite directions, comprising a first channel to and from which a tape can be fed lengthwise and having a first conduit connection adapted for connection with a source of negative air pressure and a scond channel communicating with the first channel and having a second conduit connection adapted for connection wth a source of negative air pressure, the arrangement being such that a tape loop is drawn lengthwise of the first channel by negative air pressure applied thereto from said first conduit and that when the length of the loop is sufficient the loop is turned and drawn lengthwise along the second channel by negative air pressure applied thereto from said second conduit.

2. A reservoir according to claim 1, wherein the first and second channels are located in side-by-side parallel relation and the conduit connections are so disposed as to permit the tape loop to be drawn in opposite directions along said channels.

3. A reservoir according to claim 2, wherein channels are formed in a container having a partition disposed between opposed end walls thereof to form with said end walls the opposite sides of the first and second channels.

4. A reservoir according to claim 3, wherein the partition is of shorter length than that of said opposed end walls and the inner end thereof is opposed by a baffle element spaced therefrom and transverse thereto to guide the tape loop during the turning thereof into and out of the second channel.

5. A reservoir according to claim 4, wherein a freely rotatable roller is located adjacent the inner end of the partition for engagement with the side of the tape loop opposite the side thereof which is engaged by the baffle element.

6. A reservoir according to claim 1, wherein the first and second channels are located substantially at rightangles one to the other.

7. A reservoir according to claim 6, wherein a freely rotatable roller is located at the junction of two adjoining sides of the channels for engagement by a side of the tape loop as the side enters or leaves the second channel.

8. Tape-feeding apparatus comprising a tape spool rotatable in either of two directions, a reversible electric motor operable to effect rotation of the spool, a first channel to and from which tape can be fed lengthwise from and to the spool and in which the tape is formed into a loop, a second channel located in side-by-side relation with and communicating with the first channel and into which the looped portion of the tape is turned when the length of the loop exceeds that of the first channel, conduit connections adapted for connection with a source of negative air pressure and communicating with the channels in a manner such as to permit the tape loop to be drawn lengthwise through the first channel, to be turned into the second channel, and to be drawn lengthwise along the second channel, and a switch connected in the motor circuit and operable to interrupt said circuit when air pressure in a predetermined region of one channel equals that of the pressure in a predetermined region of the other channel.

9. Tape feeding apparatus according to claim 8, wherein the switch is located in an enclosure having a pair of openings communicating one with each said channel, and a flexible element adapted to extend across the enclosure has said openings located one to one side thereof and the other to the opposite side thereof and is connected with the switch to effect operation thereof when pressure on the opposite sides of said element is equal.

10. Tape feeding apparatus according to claim 9, wherein the switch is provided with a pivoted operating member and the flexible element comprises a tape loop of which one end is connected to the operating member and the opposite end is connected to the enclosure.

11. Tape feeding apparatus according to claim 10, wherein the channels are formed in a container having a partition disposed between opposed end walls thereof to form with said end walls the opposite sides of the first and second channels.

12. Tape feeding apparatus according to claim 11, wherein the partition is of shorter length than that of said opposed end walls and the inner end thereof is opposed by a baffle element spaced therefrom and transverse thereto to guide the tape loop during the turning thereof into and out of the second channel.

13. Tape feeding apparatus according to claim 12, wherein a freely rotatable roller is located adjacent the inner end of the partition for engagement with the side of the tape loop opposite the side thereof which is engaged by the baffle element.

14. Tape feeding apparatus according to claim 9, wherein the channels are formed in a container having a partition disposed between opposed end walls thereof to form with said end walls the opposite sides of the first and second channels.

15. Tape feeding apparatus according to claim 14, wherein the partition is of shorter length than that of said opposed end walls and the inner end thereof is opposed by a baffle element spaced therefrom and transverse thereto to guide the tape loop during the turning thereof into and out of the second channel.

16. Tape feeding apparatus according to claim 15, wherein a freely rotatable roller is located adjacent the inner end of the partition for engagement with the side of the tape loop opposite the side thereof which is engaged by the baffle element.

References Cited in the file of this patent

UNITED STATES PATENTS

| | | |
|---|---|---|
| 2,792,217 | Weidenhammer et al. | May 14, 1957 |
| 2,796,223 | Detweiler | June 18, 1957 |
| 2,831,678 | MacNeill | Apr. 22, 1958 |